United States Patent
Jones et al.

(10) Patent No.: US 10,921,093 B2
(45) Date of Patent: Feb. 16, 2021

(54) MOTION TRACKING, ANALYSIS AND FEEDBACK SYSTEMS AND METHODS FOR PERFORMANCE TRAINING APPLICATIONS

(71) Applicant: Virtual Sports Training, Inc., Mission Viejo, CA (US)

(72) Inventors: Erik W. Jones, Ladera Ranch, CA (US); Norman J. Pressman, Glencoe, IL (US)

(73) Assignee: Virtual Sports Training, Inc., Ladera Ranch, CA (US)

( * ) Notice: Subject to any disclaimer, the term of this patent is extended or adjusted under 35 U.S.C. 154(b) by 1453 days.

(21) Appl. No.: 14/607,623

(22) Filed: Jan. 28, 2015

(65) Prior Publication Data

US 2016/0252326 A1  Sep. 1, 2016

Related U.S. Application Data

(60) Provisional application No. 61/933,221, filed on Jan. 29, 2014.

(51) Int. Cl.

| | |
|---|---|
| *F41G 3/26* | (2006.01) |
| *F41A 33/00* | (2006.01) |
| *G09B 9/00* | (2006.01) |
| *G09B 19/00* | (2006.01) |
| *H04B 1/3827* | (2015.01) |
| *H04L 29/08* | (2006.01) |
| *F41G 11/00* | (2006.01) |

(52) U.S. Cl.
CPC ............... *F41G 3/26* (2013.01); *F41A 33/00* (2013.01); *G09B 9/003* (2013.01); *G09B 19/00* (2013.01); *H04B 1/3833* (2013.01); *H04L 67/12* (2013.01); *F41G 11/003* (2013.01)

(58) Field of Classification Search
CPC ........ F41A 33/00; F41A 17/063; H04N 5/772
See application file for complete search history.

(56) References Cited

U.S. PATENT DOCUMENTS

| | | |
|---|---|---|
| 8,100,694 B2 * | 1/2012 | Portoghese ............. F41A 33/02 434/21 |
| 9,248,361 B1 | 2/2016 | Jones |
| 9,752,840 B1 * | 9/2017 | Betro .................... H04W 4/028 |
| 2002/0051953 A1 * | 5/2002 | Clark ...................... F41A 33/02 434/16 |

(Continued)

OTHER PUBLICATIONS

Henry, Patrick. Pistol Correction Chart. Dec. 23, 2013. http://aeigsacademy.com/category/training/.*

(Continued)

*Primary Examiner* — Robert J Utama
(74) *Attorney, Agent, or Firm* — Stout, Uxa & Buyan, LLP; Donald E. Stout

(57) ABSTRACT

A highly portable system includes the necessary logic and analysis to provide immediate feedback and corrective instruction for any suitable motion. In particular, the system includes a capability for tracking individual shooter performance in a more comprehensive way, in order to provide an organized and methodical feedback to the shooter for the purpose of data-supported improvement, as well as the opportunity to improve marksmanship using dry-fire techniques, when a shooting range is unavailable and/or to reduce ammunition consumption.

11 Claims, 4 Drawing Sheets

(56) References Cited

U.S. PATENT DOCUMENTS

| | | | |
|---|---|---|---|
| 2004/0121292 A1* | 6/2004 | Chung | F41A 33/00 434/11 |
| 2008/0032268 A1* | 2/2008 | Farrell | F41A 17/06 434/16 |
| 2008/0112698 A1* | 5/2008 | Ray | G03B 17/00 396/56 |
| 2008/0233543 A1* | 9/2008 | Guissin | F41A 33/00 434/19 |
| 2012/0214137 A1* | 8/2012 | Goree | F41A 17/063 434/19 |
| 2012/0251982 A1* | 10/2012 | Hester | F41G 3/2694 434/19 |
| 2012/0297654 A1 | 11/2012 | Williams et al. | |
| 2013/0071815 A1* | 3/2013 | Hudson | F41G 3/26 434/19 |
| 2015/0369554 A1* | 12/2015 | Kramer | F41A 17/063 386/227 |
| 2016/0165192 A1* | 6/2016 | Saatchi | H04N 5/772 386/227 |

OTHER PUBLICATIONS

International Search Report and Written Opinion dated May 26, 2015 in connection with corresponding PCT App. No. PCT/US2015/013281.

\* cited by examiner

MOTION TRACKING, ANALYSIS AND FEEDBACK SYSTEMS AND METHODS FOR PERFORMANCE TRAINING APPLICATIONS

This application claims the benefit under 35 U.S.C. 119(e) of the filing date of Provisional U.S. Application Ser. No. 61/933,221, entitled Pistol or Rifle Motion Capture and Analysis Systems, filed on Jan. 29, 2014, which application is expressly incorporated by reference, in its entirety.

BACKGROUND OF THE INVENTION

The invention is related to motion data capture, analysis, display, storage, retrieval, communication and professional feedback for the purpose of evaluating the body motion of a subject involved in a challenging fine motor and/or gross motor neuromuscular activity. One particular activity includes target-based applications, such as firearms training.

Certain tools exist today that allow users to capture motion and analyze the motion. These tools typically comprise video-based, wearable sensor-based or wireless sensor-based approaches. Current tools have limitations due to available equipment, performance constraints, and the need for human interpretation of gathered data. In the case of video capture, the user must have a video camera equipment setup in the location where the user wishes to use the equipment. In the case of wearable sensors, the sensors provide positional data that must be analyzed by a professional or otherwise skilled analyst to provide valuable feedback to the user. Furthermore, the wearable sensors are unable to be located in a precisely reproducible position with respect to the body of the user, thus introducing variability in the measured positions. In these cases, the video or motion data is displayed in computer tables or graphs that show numerical results for human motion. These tables and graphs need a trained professional or skilled analyst, as noted above, to determine if certain numbers or values exceed limits or show trends indicating a problem. Thus, none of these systems are a) portable b) work without a professional instructor reviewing the results and recommending correction, or c) suitable for real-time feedback during or immediately post each training event.

SUMMARY OF THE INVENTION

The present invention solves the problems in the prior art approaches by offering a highly portable system which includes the necessary logic and analysis to provide immediate feedback and corrective instruction for any suitable motion. It meets a heretofore unmet need for tracking individual shooter performance in a more comprehensive way, in order to provide an organized and methodical feedback to the shooter for the purpose of data-supported improvement, as well as the opportunity to improve marksmanship using dry-fire techniques, when a shooting range is unavailable and/or to reduce ammunition consumption. Additionally, it provides a means to quantify user performance results such that an adaptive training system can be produced which modifies the complexity of the targets and training exercises to minimize training time.

Particularly in the case of firearms training, there are very few systems known in the art for analyzing errors in marksmanship and target training. The system of the present invention provides a complete closed loop of motion capture, data analysis, and corrective feedback without the need to have a professional or otherwise trained expert personally or manually review the results. In essence, the necessary professional and/or expert analysis is built into the inventive system to provide the expert feedback immediately and in an automated fashion. The feedback may be multimodal, including audio and optical feedback mechanisms, for example. Other systems, where they exist, rely on human interaction and professional review of each shot taken, or an engineer to interpret charts, graphs, and numbers.

The inventive system uses a small unobtrusive, strategically and reproducibly placed sensor on the firearm, such as a pistol, for electronically sensing all motion and then communicating the resultant data wirelessly to a software application downloaded to any smart phone or other suitable personal communications device/processor, such as a tablet device. The sensor preferably captures the movement occurring during a time period before, during, and after each shot, and sends the data to the communications device, which then transmits the data to a remote database hosted elsewhere on a suitable file server. The unit also may include a video camera that wirelessly attaches to the communications device in a reproducibly located relative position to the unit. The communications device software application contains the software and algorithmic data and intelligence required to report immediately the error mode of any shot taken with the firearm. Remote data communication is used to provide additional data analysis and reporting services that add group training as part of the system architecture. The remote server-based software analyzes, evaluates, compares and reports the results for each user/shooter to a central account for group evaluation of multiple users. The possibilities for additional features or "apps" are unlimited. The remote system is capable of handling an unlimited number of accounts and can be used for coaching of professional shooters in law enforcement, military organizations, or private professional enterprises, or for just competitive fun as shooters compare their shots.

More particularly, there is provided in one aspect of the invention a firearms motion capture and analysis system, which comprises a motion sensor for detecting and reporting data related to the motion of a firearm held by a user. Software is disposed on a personal communications device for receiving data from the motion sensor and transmitting the data to a host server, which may comprise any suitable computational, storage and communication device. Software is also disposed on the host server for receiving the transmitted data and analyzing the transmitted data by comparing the transmitted data to reference data (which may comprise historical data related to the user's past activities, and/or data generated by other shooters, such as professional shooters), stored on a database on the host server. The host server software is further adapted to transmit analyzed data back to the personal communications device. The software on the personal communications device is adapted to communicate the analyzed data to a user, which may be via a screen or other display device of the personal communications device, and/or by other means, such as using visual or aural alarms, or providing aural instruction. Of course, within the scope of the invention, the personal communications device may comprise one of a smart phone and a tablet computer, or any other suitable personal communications device known to those skilled in the art.

In the illustrated embodiment, the motion sensor is attached to the firearm, to an under-barrel rail disposed on the firearm. The motion sensor also may optionally comprise a video camera.

The system may further comprise a sound reproduction device, which may be an earpiece, for communicating aural instructional feedback to the user, as well as a connection from the host server to an instructor dashboard, and a connection from the instructor dashboard to the personal communications device.

The display comprises a graphical user interface (GUI) indicating shot accuracy and motion of the firearm before, during, and/or after a particular shot, as analyzed by the software, data, and digital algorithms disposed on the host server. In one embodiment, the GUI comprises circumferential segments which are labeled to instruct a user as to problems indicated by the motion as detected before, during, and/or after a particular shot. The system is preferably a closed loop feedback system.

Advantageously, the system comprises normal and dry-firing modes, the software disposed on the host server and/or the personal communications device being adapted to account for slide racking in non-Double Action Only (DAO) firearms.

In another aspect of the invention, there is disclosed a method of training in order to improve in the performance by a user of a particular repeatable activity. The method comprises a step of placing a motion sensor on or in a hand of a user preparing to engage in a training exercise, activating a software application on a personal communications device for receiving data from the motion sensor and transmitting the data to a remote processor, and conducting the particular activity.

In the disclosed embodiments and methods, the particular activity comprises shooting a firearm. The placing step further comprises attaching the motion sensor to the barrel of the firearm. The method further comprises a step of transmitting the data received by the software application on the personal communications device to a host server, and yet another step of processing the data received from the personal communications device to generate feedback data for transmission back to the personal communications device in real time.

The feedback data provides instruction to the user concerning accuracy of a particular shot and likely causes of problematic movement detected by the motion sensor before, during, and/or after the shot.

Advantageously, the processing step includes a dry-firing mode, the dry-firing mode comprising a compensation algorithm for accounting for slide racking in non-DAO firearms.

The inventive method further comprises a step of transmitting the feedback data to an instructor dashboard.

The invention, together with additional features and advantages thereof, may be best understood by reference to the following description taken in conjunction with the accompanying illustrative drawings. In these accompanying drawings, like reference numerals designate like parts throughout the figures.

DETAILED DESCRIPTION OF THE INVENTION

Figure 1:
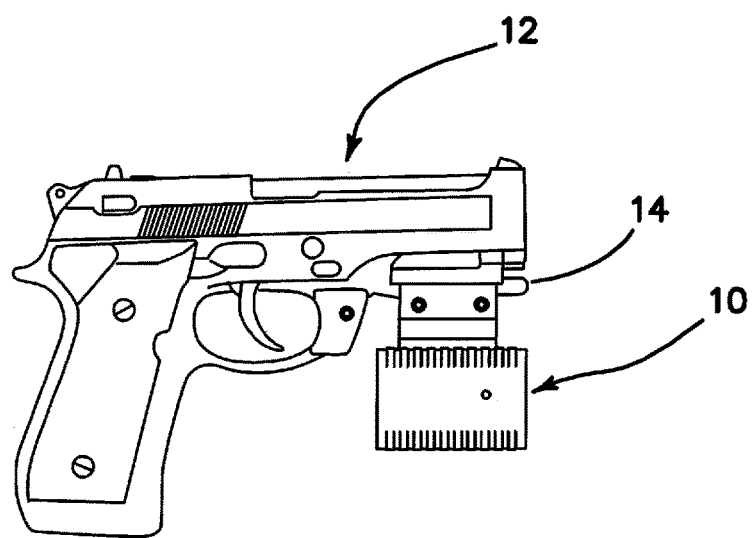
FIG. 1 is a view of a firearm, particularly a pistol, to which a sensor adapted for use in the present inventive system has been attached to the firearm, in a reproducible position.

Referring now more particularly to the drawings, FIG. 1 illustrates a small, unobtrusive, strategically and reproducibly placed sensor 10 which has been secured to a desired portion of a firearm or pistol 12. In the illustrated embodiment, the sensor 10 is mounted to an under-barrel pistol rail 14, of the type known in the art for mounting lights or laser targeting systems, but any suitable mounting may be used in accordance with the principles of the invention. For example, a trigger mount could be used, alternatively. For purposes of illustration only, examples of suitable sensors available on the market today include, but are not limited to the x-IMU™ system, available from x-io Technologies, Ltd., a UK company having a headquarters in London, as well as the MotionFit™ MPU-9150 9-axis Motion Tracking™ system, available from InvenSence, of Sunnyvale, Calif.

Figure 2:
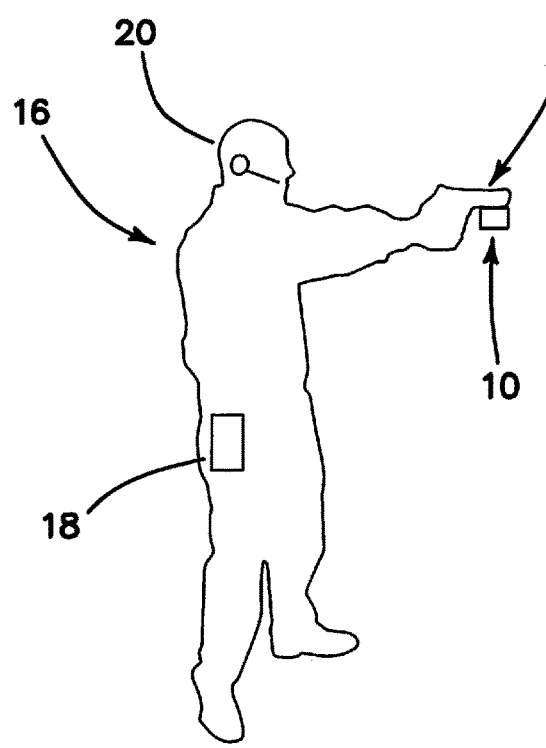
FIG. 2 is a schematic view of a person equipped for use of the system of the present invention.

FIG. 2 illustrates one embodiment for using the inventive system. As shown, a user or shooter 16 holds the pistol 12, on which is mounted the sensor 10, which may comprise both a motion sensor and a video camera, for motion capture of the pistol 12. A personal communications device 18, such as a smart phone, is on or near the user, and the user 16 may also be wearing an earpiece 20, as illustrated, for voice command and instructional feedback.

Figure 3:
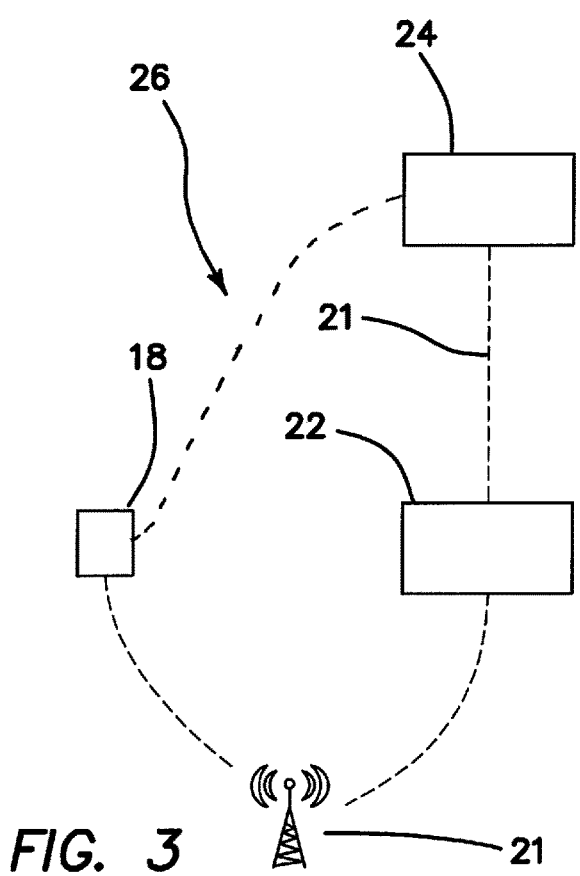
FIG. 3 is a schematic view showing elements of the inventive system wirelessly connected for communication with one another.

In FIG. 3, a schematic diagram of a typical inventive data transmission and processing system 26 for use in the invention is shown. The system 26 comprises the aforementioned personal communications device 18, which is connected through a cellular data connection 21 or another data transmission connection, such as a wireless local area network (WIFI), to a file server system 22 (host server), which in turn may be connected through another data connection 21 to an instructor dashboard 24. Note that the "host server" may comprise any suitable computational, storage and computational device, as such may be known now or in the future.

Referring now to each of FIGS. 1-3, the inventive system is a small, lightweight, portable marksmanship training system that detects ("sees"), analyses, compares and evaluates each shot taken by the user 16 in a way that even video-based systems cannot. The personal communications device 18 has downloaded thereon a software application, in Android, iOS, or other suitable format, that executes data analysis software, reports shot results, transmits recorded data via the data connection 21, and exercises other control functions. The advanced motion capture sensor 10 records key shot motion from "Aim" through shot completion. For example, the sensor detects pointing direction of the firearm, as well as the quality of the trigger pull based upon pattern recognition software-based algorithms. This motion capture data is wirelessly sent to the personal communications device 18. The same data is immediately sent to the remote file servers 22 which host the system, where it is stored, analyzed and otherwise processed in accordance with the terms of an account the user and/or instructor maintains with the file server host entity.

Thus, in use, as a shot is taken by the user 16, the software application on the personal communications device 18 immediately forwards the motion capture data collected from that shot to a software application hosted on the remote file servers 22, which process the data and provide firearm aiming animation of the shot, additional shot analyses, and both audio and video feedback on how to correct problem areas. Sophisticated analytics immediately compare the data from the current shot against the data in the user's account database to determine trending and recommend corrections. This all happens automatically and immediately after each shot is taken, so that closed loop feedback is returned in real time.

The inventive system is an all-in-one shot analysis and professional instruction system. It can be used with a smart phone, tablet computer, or any other mobile computing device in practice situations to provide animation of each shot for playback and analysis of one or more multiple movements within the shot. The video can be used to compare the user's shot to professionals or other skilled experts, the user's prior shot(s), or any other shot previously contained in the database 22. In addition, instructional thoughts or targeted situational advice from professionals are available to assist in shot accuracy improvement and mental conditioning. Since the shot analysis and evaluation are immediately available, and transmitted through a personal communications device 18, the analysis can be available to a coach or stored in a digital file for future analyses and evaluations. This allows the teaching professional to optimize his/her time and perhaps multiply earnings through virtual training sessions. The portal offers ways for the training professional/coach to communicate directly, privately, and securely with the student and to study the results of the analysis using the instructor dashboard on his/her personal computer or other processor 24. Thus, the inventive system is versatile in its ability to both provide immediate and helpful feedback to the user 18 during a shooting session, and also to allow the user or an instructor to further analyze the data over time and provide thoughtful and thorough feedback or self-analysis at a later time. This system is, of course, suitable for individual instruction and analysis, but may also be used by an instructor for group sessions, to provide generalized feedback to the group regarding problems that they are experiencing. This system is also suitable for instructors to learn how to improve their skill and performance in training their students.

In addition to training and analysis of the user's shots and motion taken during the shots, the data may be processed by the system to estimate bullet travel parameters and trajectory, which could be useful for a variety of applications, including forensics data analyses.

The software platform of the present invention demonstrates the motion capture and display of firearm movement, data transfer to the personal communications device, and audible and visual feedback of results. In one particular approach, algorithms are used to analyze the tracked motion of the human subjects. By distinguishing the analytical algorithms in signal processing algorithms which, first, segregate the collected data into (a) pre-event (e.g. aiming), (b) event (e.g. shot, including trigger pull); and © post-event (e.g. time back to target), the system has the ability to introduce multi-tiered or multi-staged signal processing software-based algorithms which first parse the signals into temporal bands, and subsequently, use potentially different algorithms to analyze the signals within each of the temporal bands. The human behavior within each distinct temporal band is characterized, and dynamic feedback is generated to the human subject to alter the human subject's behavior contemporaneously with the events unfolding, or to generate performance measures of the human subject's movements during each of the segregated periods of action.

Figure 4:
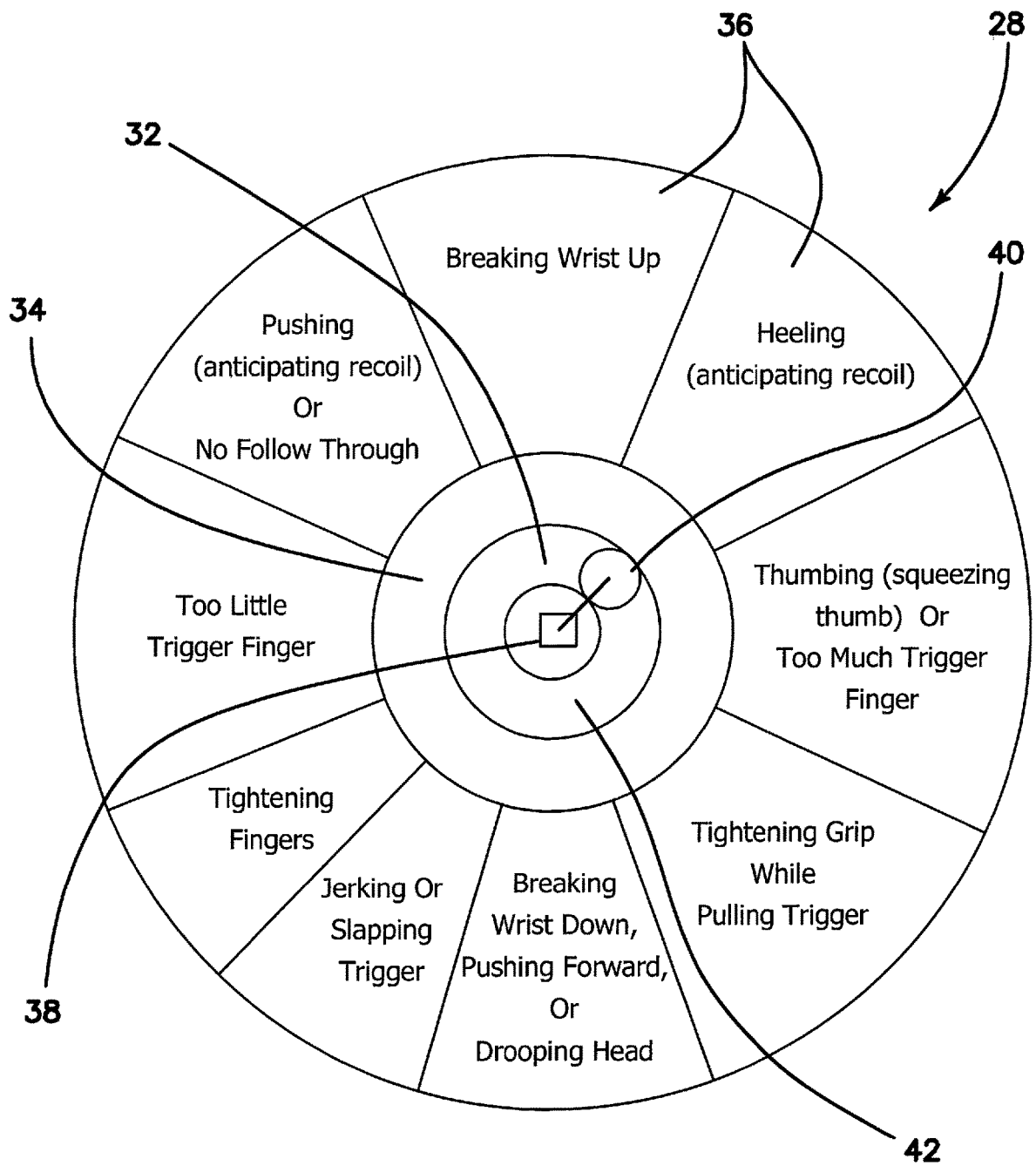
FIG. 4 is a view of a typical diagram which might be displayed on the screen of either the personal communications device (such as a smart phone) or of a laptop computer or the like, illustrating the results of a well-targeted shot taken by a user and feedback data as to movement which resulted in the accurate shot.
Figure 5:
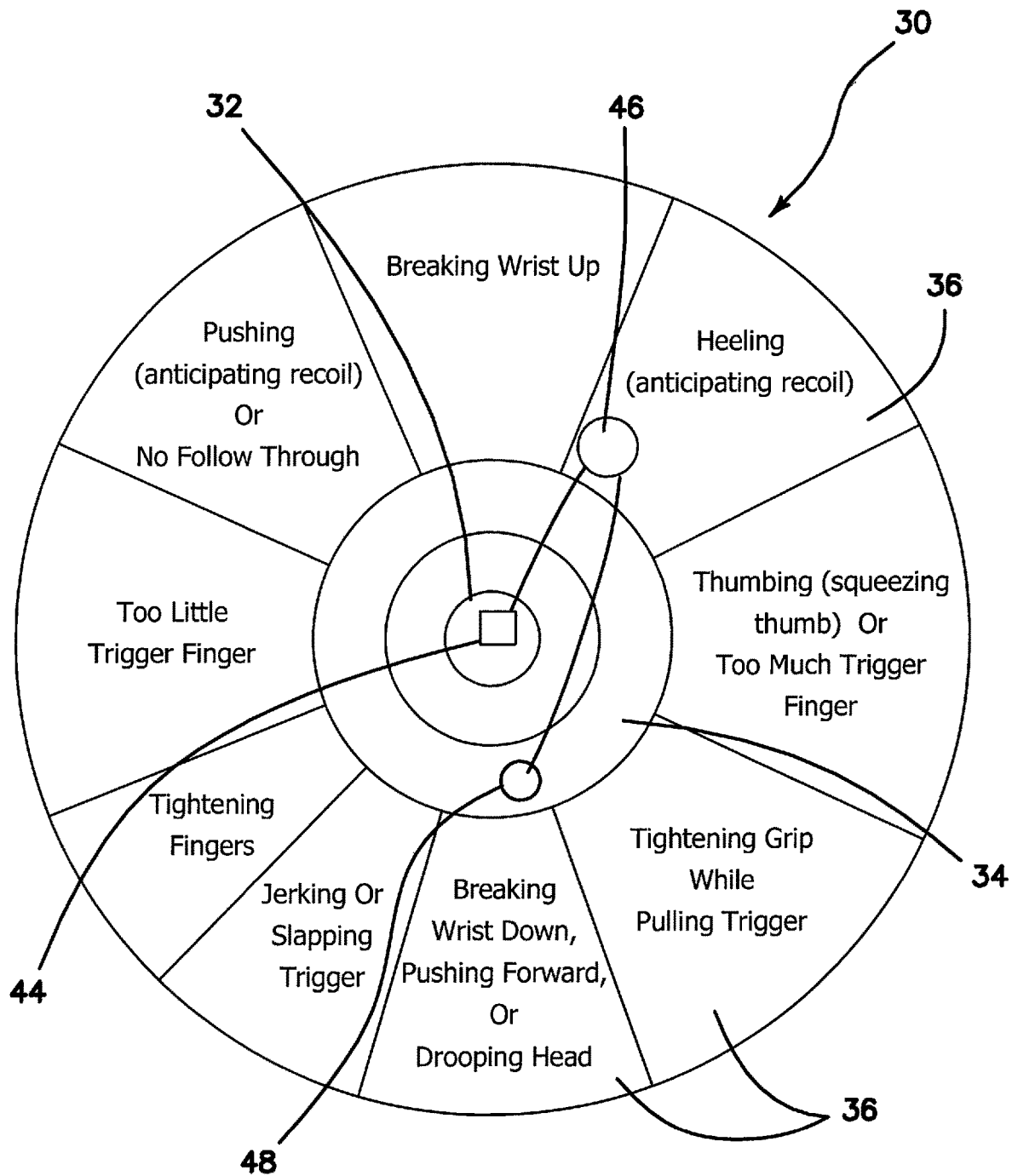
FIG. 5 is a view similar to FIG. 4, wherein the shot was less accurate, and the displayed resultant data identifies the nature of the errant motion causing the error in the shot.

An example of the user interface, which could be displayed on either or both of the personal communications device 18 or the instructor dashboard 24, or any other connected processor with display screen, is illustrated in FIGS. 4 and 5, wherein the movement is displayed on the personal communications device or dashboard display by indicating movement of the pistol before trigger pull, at firing, and completion. In FIG. 4, there is shown an accurate shot interface 28, while in FIG. 5 an inaccurate shot interface 30 is shown. Of course, these are exemplary only, and there are many other ways to display useful processed data, in graphical or alternative formats, which would fall within the scope of the invention.

More particularly, as can be seen in both FIGS. 4 and 5, the representative interface comprises a chart resembling a segmented pie, having a bulls eye 32 in the center, surrounded circumferentially with a near miss zone 34. Surrounding the near miss zone 34 are nine circumferential segments 36, each of which is labeled with information concerning shooting problems related to the user's shooting motions which would have potentially caused the missed shot, if applicable. For example, as shown, the segments represent such problems as "breaking wrist up", "heeling (anticipating recoil)", "too much trigger finger", "too little trigger finger", etc. In FIG. 4, a mark 38 represents motion prior to the trigger pull. Since it falls within the bulls eye, it is acceptable, though, in shooting, the perfect motion at all times is zero. A second mark 40 is colored green (the color, of course, is not shown in the figure), because it represents a shot which acceptably hit the target (in the case of a dry-firing exercise, the accuracy of the shot is simulated by the software). Of, course, alternative markings to the color green may be used. This mark represents the motion detected as the gun was fired. It is within the bulls eye zone 32, but slightly to the 2 o'clock direction, indicating a slight tendency toward both heeling (anticipating recoil) and thumbing (squeezing the thumb), or two much trigger finger. A mark 42 is also shown, in the lower portion of the bulls eye zone 32, at about 180 degrees from the top of the interface 28, representing detected motion after the shot in question. As shown, the placement of the mark 42 in the bulls eye zone indicates a slight tendency, after firing, toward "breaking wrist down, pushing forward, or dropping head".

FIG. 5, on the other hand, shows the results of a second shot, wherein a mark first mark 44 represents acceptable motion before the trigger pull, mark 46 represents motion at the time of the shot, which is colored red (color not shown), because it was unacceptably inaccurate (or otherwise suitably marked—the color red is not required), and mark 48 represents motion after the shot. As shown by the mark 46, the motion at the time of the trigger pull is substantially in about a 1 o'clock orientation on the chart, representing a tendency toward heeling (anticipating recoil), and perhaps breaking the wrist up. These errant motions may be interpreted as resulting in the inaccurate shot. Mark 48, though falling within the near miss zone 34, falls in the direction showing a tendency, immediately after the shot, toward breaking the wrist down, pushing forward, drooping head, or even perhaps tightening the grip while pulling the trigger.

It should be noted that segmented charts of the type shown in FIGS. 4 and 5 are known in the art, but are typically provided as paper targets, and are placed down range from the shooter 15 or 30 yards. If the shooter properly aims, but hits any segment other than the bull's eye, the verbiage on the segments represent potential errors of the user during trigger pull. They cannot, however, tell the shooter about errors during aiming or report (recoil). In the inventive system, without the need for an actual target, or even ammunition, the same movement and result is captured by looking at the motion during trigger pull, using sensor 10.

In the case of the paper target, the use of the chart "assumes" that the user is properly aiming at the bull's eye and that if a bullet lands in the area shown, then the assessment of the shooter's trigger pull is captured. The drawback of this approach is a) you must be aiming properly at the bull's eye of this particular target, and b) you could experience aiming error and experience an error that is mis-reported. The present inventive system looks at the motion during trigger pull, with no need for the actual target to be present, and then analyzes that motion. An additional benefit to motion capture using the inventive system is that more experienced shooters and competitive shooters wish to reduce recoil to a minimum, and to be able to measure time back to target. The system allows for that benefit, by sensing and analyzing post-shot motion. Moreover, as noted in the foregoing description, the present system also captures and analyzes pre-shot (aiming) motion, where breathing and the ability for the shooter to hold the firearm steady can be measured accurately, precisely and rapidly, and subsequently stored electronically for later retrieval, display and analyses. Some instructors tell students to draw an infinity symbol (∞) over the target. The pre-shot movement can be very small and difficult for the instructor to track. However, with the motion capture of the inventive system, such rapid and spatially limited motions of a shooter can be captured accurately, precisely and objectively, and analyzed comprehensively and objectively as well.

Figure 6:
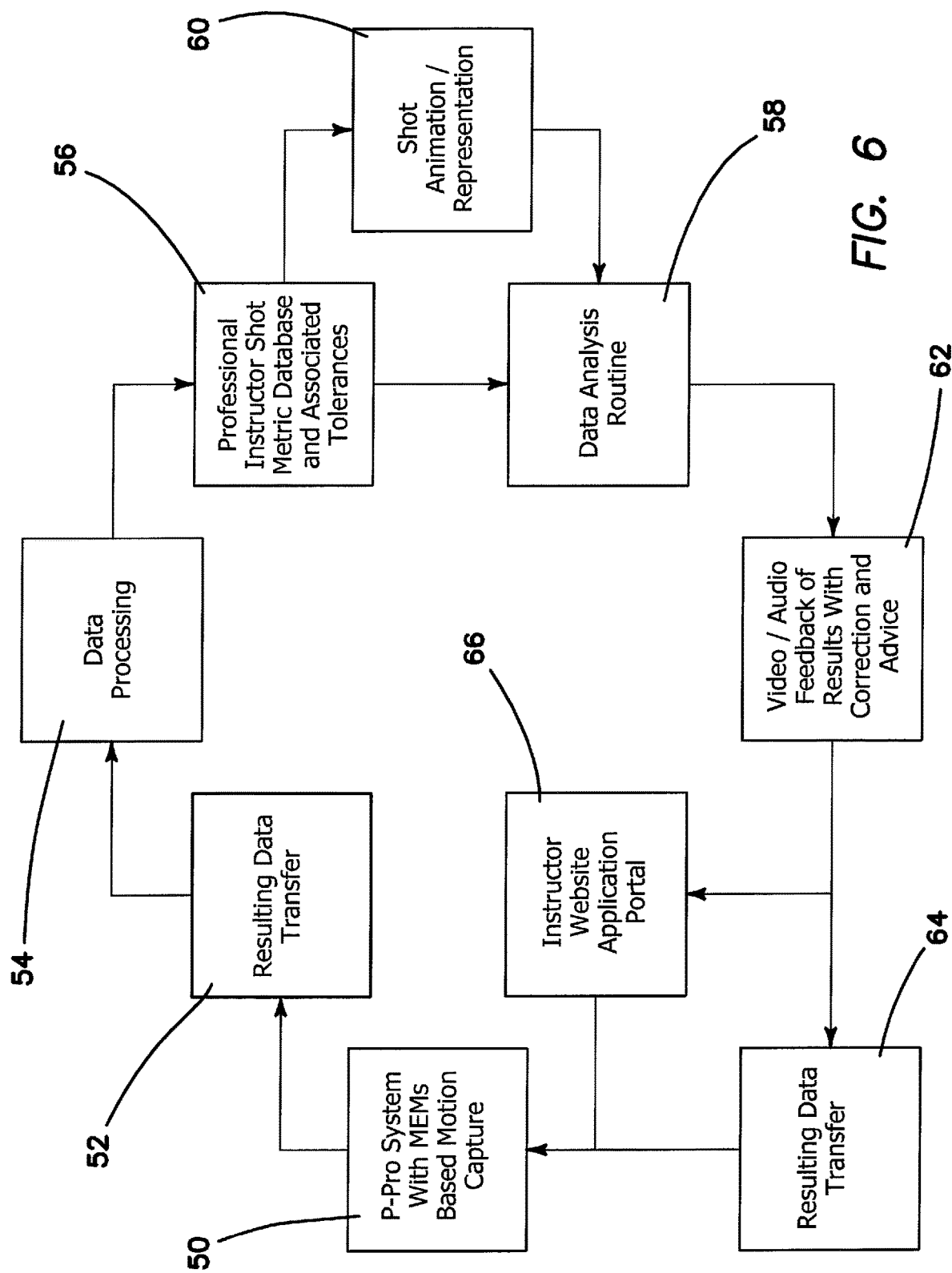
FIG. 6 is a schematic view showing the elements of one particular embodiment of the inventive system.

FIG. 6 is a schematic diagram illustrating elements of the inventive system, as arranged in a closed loop system. Reviewing the elements of this system, box 50 represents motion capture which occurs during each shot, with MEMs (Microelectrical Mechanical Systems)—based motion capture. The captured data is then transferred 52 to the remote file servers 22, where it is processed 54 and compared against an account database 56 so that the comparative data can be analyzed 58. As shown, the data may be simultaneously (or separately) processed to generate a shot animation/representation 60, which is then fed back into the data analysis routine 58. As a result of the data analysis, video audio feedback of the results with correction and advice 62 is generated, and transferred 64 back to the user's personal communications device 50. In parallel, or separately, from the transfer of feedback data to the user, this data may also be transferred 66 to an instructor website application portal 66.

As noted above, the system of the present invention is useful in both live ammunition and dry-firing modes. Applicant has found that many users of a system like that disclosed in this application indicate that they are not familiar with their own firearm, and the "feel" of the trigger, because of limited opportunities, particularly in urban and suburban areas, to practice shooting with the firearm. Dry-fire is the use of the firearm to pull the trigger, resulting in hammer drop, to practice trigger pull. The system monitors, analyzes and reports on the quality of the user's trigger pull before, during and after that trigger pull. For the dry-firing mode to work, the system depends upon the mechanical impact energy that propagates from the hammer strike to the motion sensor. The dry-fire mode is one of the important and innovative aspects of the present invention.

There are many guns that require the firing of a live bullet to cock the hammer. An example are handguns manufactured by Glock, Inc., having U.S. offices in Smyrna, Ga. Unlike DAO guns, which cock the hammer during trigger pull even without a live bullet, to use a Glock or similar gun in dry-fire mode, the user must manually "rack" the gun, which is the process of grabbing the slide and pulling it back. Without compensation to account for this in the system, this motion and the resulting mechanical energy will be interpreted by sensor as trigger pull and the mechanical impact of hammer drop.

However, the present invention uses an algorithm to differentiate between the impact energy of trigger pull/hammer drop and slide racking. This mechanical energy has very similar properties, as noted above, but the algorithm accounts for slide racking so that, during a drill, when the sensor is recording every move and looking for hammer drop impact signature, a slide rack will be identified, documented in the database, and ignored, while the drill continues with analysis of the actual trigger pull. The software-based digital signal processing includes motion tracking data filtering to accomplish this task, as well as the user learning necessary to identify the racking signature and ignore it during analysis. Other approaches to account for slide racking in non-DAO firearms are a) limit each drill to only one shot, b) run the drill through a manual process of stopping the drill while racking and then re-starting, and c) automating a process of instructing the user to rack while the software application waits, then starting recording with the ensuing trigger pull.

Although the invention has heretofore been described specifically in connection with the example illustrated in FIGS. 1-6, the principles thereof are applicable to many more situations and circumstances, both within and outside of the field of firearms. For example, within the field of firearms, the system may be used to train shooters in many different environments, such as stressful environments wherein the shooter is placed under duress in some manner. This duress could be, for example, a hot or cold environment, or one in which targets pop up unexpectedly in such a way as to surprise the shooter, as is often done during police academy and military training scenarios. In addition to movement of the firearm, the biometrics of the user (e.g. pulse rate, transepidermal water loss (i.e. sweat), and eye movement) could be measured and evaluated, and correlated to the outcome of the activity being evaluated.

For example, the system may include the capability to generate a visual scene in which the target appears randomly in position and/or time on a computer-generated display, so that the human subject's ability to respond can be measured as a function of time to respond and as a function of position at which the target appears relative to the optical axis of view of the human subject and distance of motion required by the human subject to reposition him/herself to reach or point at the target. Another visual scene might be generated in which the target appears in the midst of varying (measured and planned) degrees of non-target motion in these scenes, which may neurologically distract the human subject. Yet a third visual scene might be established wherein noise or other sounds are introduced at varying frequencies, intensities and color distributions which may serve to distract the human subject so that the performance of the human subject can be tracked, measured, and analyzed with respect to the degree of presence of unrelated sounds and sights, and the character of such sounds (e.g., white noise, speech, loud or quiet non-essential sounds, etc.) and sights (e.g., size, brightness, contrast, colors, textures, recognizable figures). Still another approach might include a visual scene which is generated and modified by a variety of means such as a) a physical target whose position can be robotically altered based upon data provided by the data processing device of the system, b) a physical target whose illumination can be altered by a lighting system (e.g. variable contrast, intensity, color balance, spectrum of illumination) based upon data provided by the data processing device of the system, c) a physical target as described above which is a component of a more complex environment of other physical entities which may provide a varied degree of scene complexity to evaluate the subject's ability to distinguish the physical target from other moving and non-moving physical objects in the same environment, with a variety of illumination and positioning coordinates for the non-target objects as well as the target object, and d) a computer-generated target displayed on a variety of display devices in which the target display can be positioned and whose illumination can be altered by computer algorithms or other means which rely upon data provided by the data processing device of the system.

While the aforementioned inventive systems and methods are disclosed, in presently preferred embodiments, as being related to firearms training, it will be appreciated by those skilled in the art that the inventive concepts taught herein are equally applicable, with suitable adaptation, to any number of other activities involving repetitive motion techniques, as discussed herein or as might be otherwise apparent to those skilled in the art. For example, the field of sports-related injury recovery and rehabilitation medicine is particularly suited for systems of this nature. Typically, the goals set by healthcare practitioners for rehabilitative medicine patients are, at best, quantitative by gross measures such as the ability to see and lift a bottle filled with a particular quantity of liquid without spilling the liquid, before resetting the bottle back on the substrate surface. By affixing mounted sensors on a reproducibly located body part, or device mounted to a body part (e.g., protective helmet) so that the motion detectors can generate tracking data from patients on an attempt-by-attempt basis in a reproducible manner, one can produce more sensitive and reproducible measures of human performance changes during clinical rehabilitation training procedures. Thus, using these systems and methods to monitor more accurately how to improve training and achieve identified performance end points can result in potentially shortened days required for rehabilitation and have more well defined and precise end points for the prescribed therapy, resulting in significantly lower healthcare costs and associated insurance premiums.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A firearms motion capture and analysis system, comprising:
    a motion sensor for detecting and reporting data related to the motion of a firearm held by a user;
    software disposed on a personal communications device for receiving data from the motion sensor and transmitting the data to a host server; and
    software disposed on the host server for receiving the transmitted data and analyzing the transmitted data by comparing the transmitted data to reference data stored on a database on the host server, the host server software being further adapted to transmit analyzed data back to the personal communications device;
    wherein the software on the personal communications device is adapted to communicate the analyzed data to a user.

2. The system as recited in claim 1, wherein the personal communications device comprises one of a smart phone and a tablet computer.

3. The system as recited in claim 1, wherein the motion sensor is attached to the firearm.

4. The system as recited in claim 3, wherein the motion sensor is attached to an under-barrel rail disposed on the firearm.

5. The system as recited in claim 1, wherein the motion sensor also comprises a video camera.

6. The system as recited in claim 1, and further comprising a sound reproduction device for communicating aural instructional feedback to a user.

7. The system as recited in claim 1, and further comprising a connection from the host server to an instructor dashboard.

8. The system as recited in claim 7, and further comprising a connection from the instructor dashboard to the personal communications device.

9. The system as recited in claim 1, wherein the display comprises a graphical user interface (GUI) indicating shot accuracy and motion of the firearm before, during, and/or after a particular shot, as analyzed by the software, data, and digital algorithms disposed on the host server.

10. The system as recited in claim 9, wherein the GUI comprises circumferential segments which are labeled to instruct a user as to problems indicated by the motion as detected before, during, and/or after a particular shot.

11. The system as recited in claim 1, wherein the system comprises a closed loop feedback system.

* * * * *